(12) United States Patent
Bergeron

(10) Patent No.: US 6,651,713 B2
(45) Date of Patent: Nov. 25, 2003

(54) EASY ON CHAINS

(76) Inventor: Rock Bergeron, 610 Boulevard St-Joseph, Québec City (CA), G2K 1W5

(*) Notice: Subject to any disclaimer, the term of this patent is extended or adjusted under 35 U.S.C. 154(b) by 0 days.

(21) Appl. No.: 10/109,294

(22) Filed: Mar. 27, 2002

(65) Prior Publication Data

US 2002/0170646 A1 Nov. 21, 2002

(30) Foreign Application Priority Data

Mar. 27, 2001 (CA) .............................................. 2342372

(51) Int. Cl.[7] .............................................. B60C 27/00
(52) U.S. Cl. ...................................... 152/219; 152/231
(58) Field of Search ................................ 152/170, 173, 152/178, 217, 219, 231, 232, 233

(56) References Cited

U.S. PATENT DOCUMENTS

| | | | | |
|---|---|---|---|---|
| 1,837,708 A | * | 12/1931 | Frank | |
| 2,403,312 A | * | 7/1946 | Sweeney | |
| 2,898,966 A | * | 8/1959 | Machesney | |
| 5,167,737 A | * | 12/1992 | Sakuma | 152/219 |
| 6,345,653 B1 | * | 2/2002 | Fu | 152/219 |

* cited by examiner

Primary Examiner—Russell D. Stormer

(57) ABSTRACT

A universal chain for wheels that is easy to install. It has a series of sections of chains to cover the tread of a tire as well as its inner and outer sidewalls. Each section comprises a number of transverse links caught by two lengths of chains placed radially along the shoulders and rigidified by arches so that the chain has a cambered form for ease of installation. On the inner shoulder the sections of chains are caught by hooks (34) that pass through a ring (36). The outer shoulder comprises an assembly part having two half-arches and an adjustable female male assembly (56) that locks with a preestablished tension and that may be unlocked when needed. This system allows using lengths of chains weighing 10 kilograms and having a certain rigidity. This type of chains is perfect for trucks driving on icy conditions and on hilly roads.

5 Claims, 6 Drawing Sheets

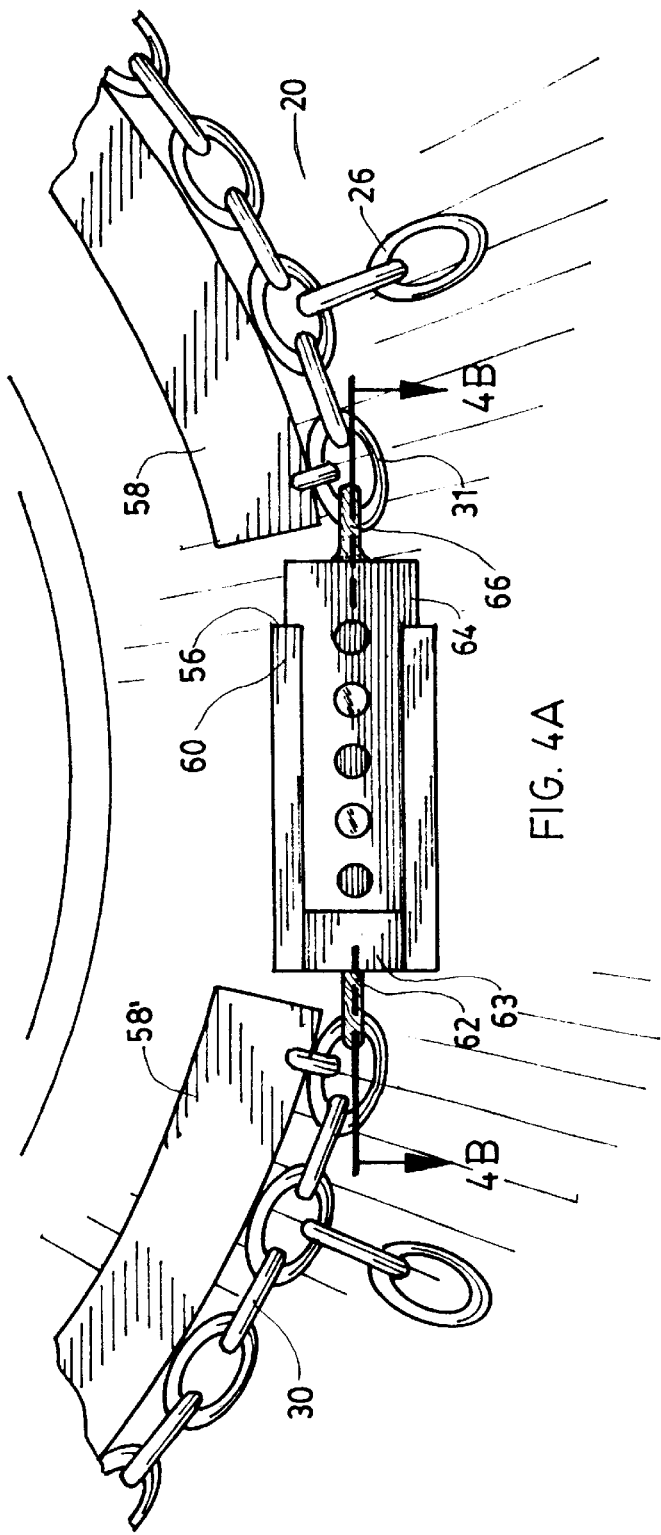
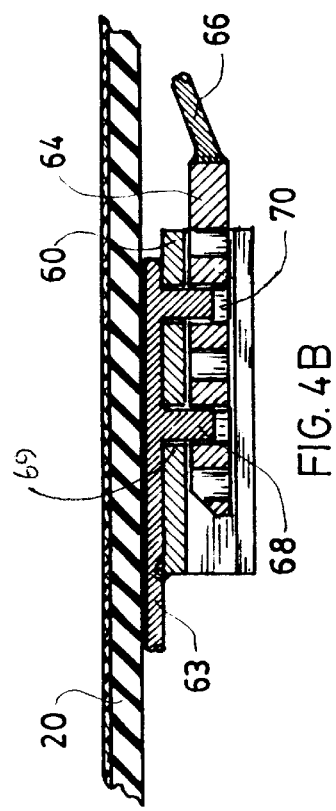

EASY ON CHAINS

BACKGROUND OF THE INVENTION

1. Field of the Invention

This invention relates to the field of chains for wheels to give a traction to a truck or a car driving on icy surfaces. It also relates to tractors on slippery ground or any other vehicle with certain types of tires.

2. Description of the Prior Art

Certain patents particularly drew our attention: U.S. Pat. No. 6,092,577, Franklin, Jul. 25, 2000 discloses an arch support 9 placed against the inner side of a tire. Two chains 5 visible outside the tire are provided with links 4 to join the support 9. The support is closed by a screwed buckle 10. The two sets of chains are joined to each other by cables and hooks. The space between the chains is too broad for easy driving over long hauls.

U.S. Pat. No. 6,085,816, Clark, Jul. 1, 2000 shows several belts which tighten the middle and the ends of chains. Chains may entangle and are hard to lay.

U.S. Pat. No. 5,707,464 Poulsen, Jan. 13, 1998 shows two parallel chains related by small chains. It is heavy to install because it is a single length.

U.S. Pat. No. 4,376,457, Guenther, Mar. 15, 1983 shows several sections all related by intermediate sections 20 provided with tensioning levers 22, 24. Too many parts are necessary for rapid installation.

U.S. Pat. No. 4,334,568, Thorpe, Jun. 15, 1982 discloses individual units, each section retained by a pair of cables: it is too long to install.

- IT 682,339 provides a full arch disposed against the internal side of a tire, with hooks and a number of pairs of transversal chains which are installed under tension. Too many parts are handled for rapid installation.
- CH 659434, Eisen Aug. 30, 1982 several sections are hinged one with respect to the other, the net effect is being too heavy.

OBJECTS OF THE INVENTION

It is a general objective of the invention to provide a universal chain for wheels that is easy to install by one person.

A more particular objective is to provide a few sections of chains of a weight less than 10 Kg for use on truck wheels, each section comprising a number of links disposed transversally, the inner and outer sides being rigidified by an ark so as to maintain a solid form for ease of installation.

Another objective is to unite radial chains one to the other by means of link hooks, the last sections being joined together by a male-female arrangement which locks in place with a preestablished tension and which may be unlocked, when needed.

BRIEF DESCRIPTION OF THE DRAWINGS

The present invention will be further understood from the following description with reference to the drawings in which:

FIG. 4A is a side view of a male-female connector.

FIG. 4B is a cut view according to line 4B—4B of FIG. 4A.

DETAILED DESCRIPTION OF AN EMBODIMENT

Figure 1:
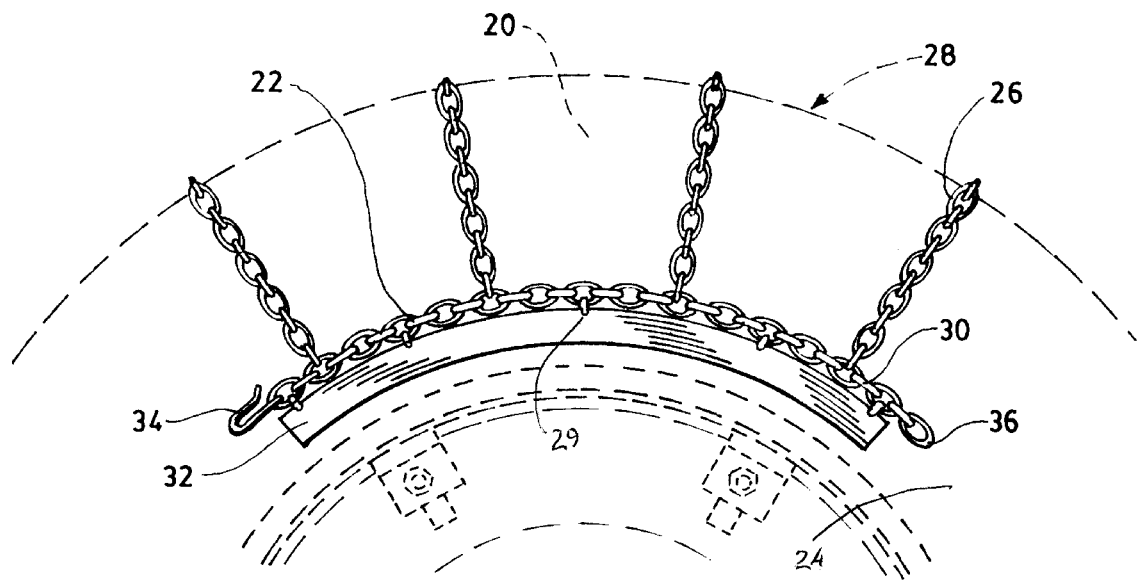
FIG. 1 is a face view of a section of an easy on chain.

An embodiment of the invention is illustrated in the drawings wherein the same numbers identify the same characterizing elements.

FIG. 1 shows a section of chain 22 installed on an inner sidewall 24 of a tire 20. The section of chain 22 comprises four transverse small chains 26 going over a tread 28, on top of the tire 20. At the bottom, there is a radial chain 30, cambered by an outer arch 32. One of the ends of the radial chain 30 carries a hook 34 and the other end a ring 36, to receive a hook 34'.

Figure 2B:
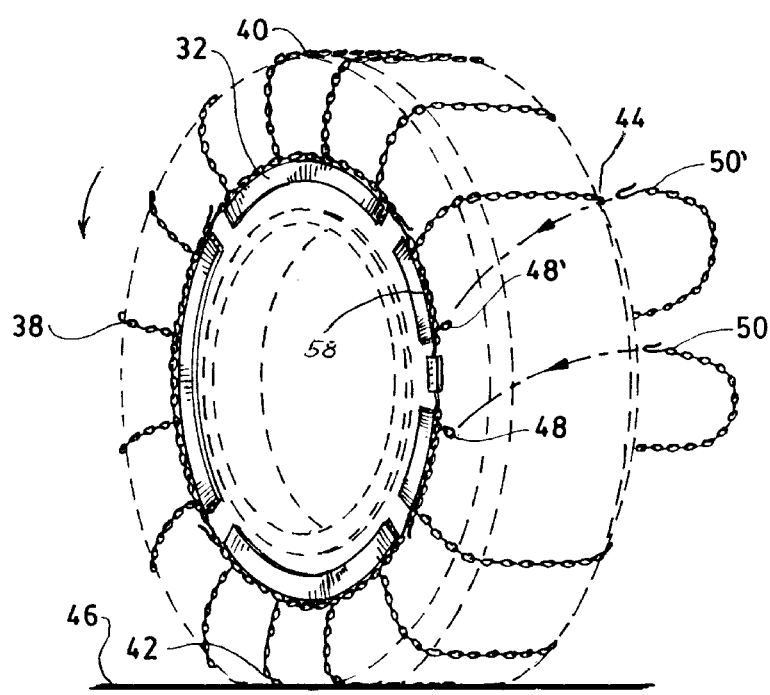
FIG. 2B is a perspective of sections of FIG. 1 assembled, with end section rotated 90 degrees to the horizontal.
Figure 2A:
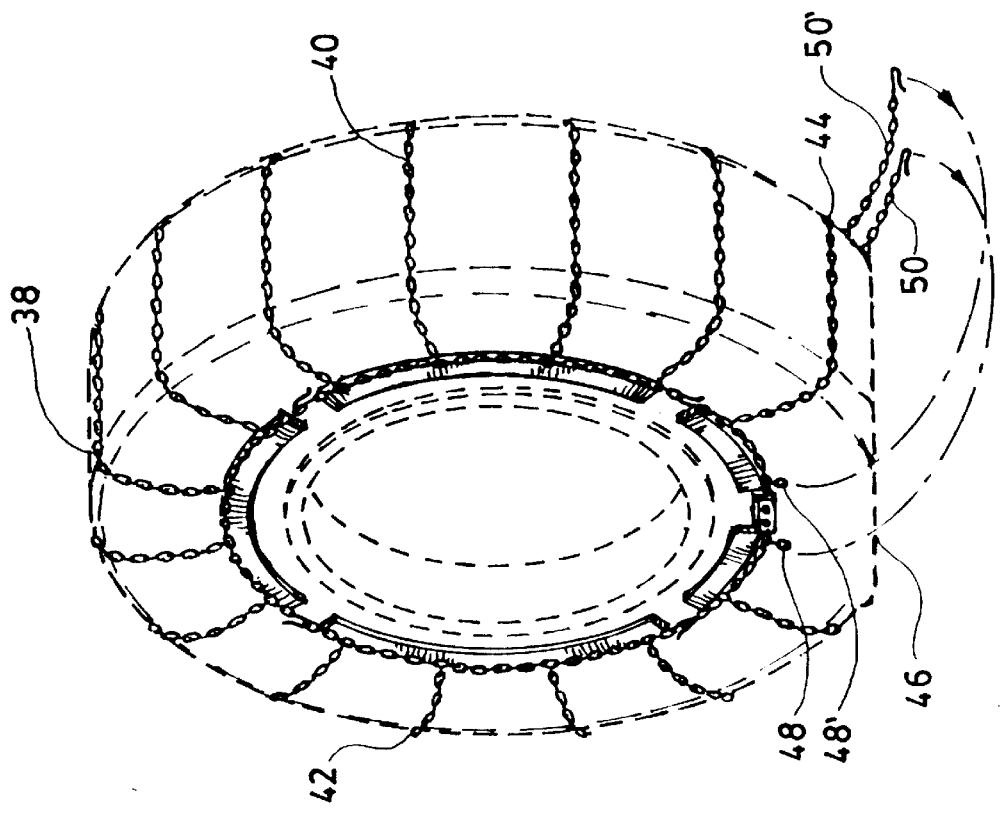
FIG. 2A is a perspective of sections of FIG. 1 assembled, with end section at the bottom.

FIG. 2A shows the tire 20, the footprint being flat. There are four sections in a chain; an upper section 38, a right section 40, a left section 42 rientated towards the front of the truck and a lower section 44 close to the ground 46. There are two transverse links 48, 48' as well as their corresponding transverse hooks 50, 50' that are not hooked to the transverse links 48.

FIG. 2B shows the wheel tire, rotated. What was the left section 42 is now on the ground and what was the lower section 44 is now on the right side, toward the rear of the truck. The two transverse hooks 50', 50 may now be hooked to the positions of transverse links 48, 48' in the middle of the two half arches 58, along the path of what was radial chain 30.

Figure 3:
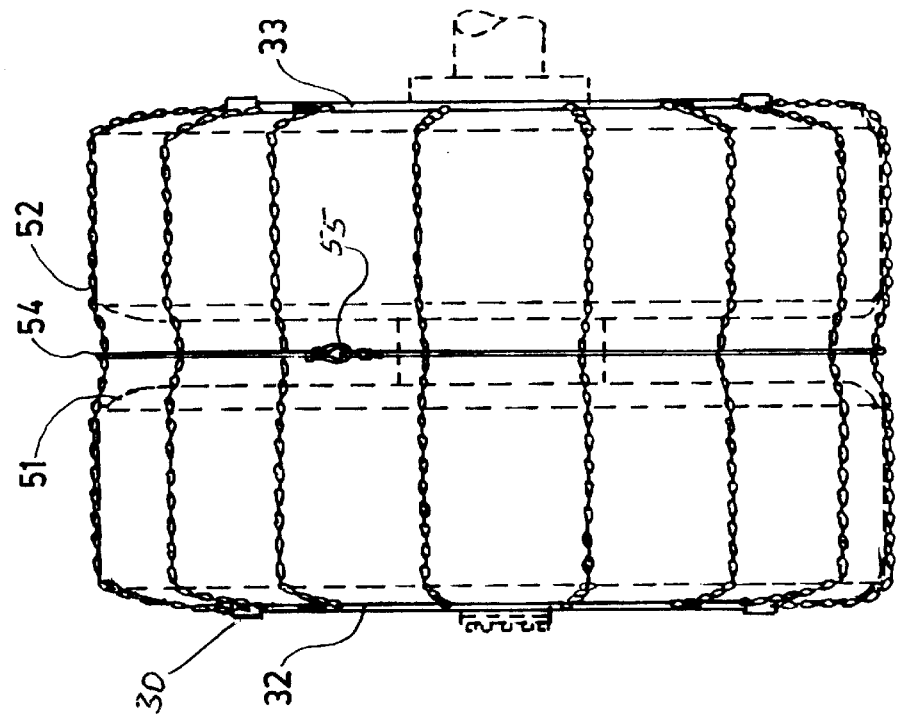
FIG. 3 is a top view of a pair of double sections.

FIG. 3 shows a pair 51 of wheels with an outer arch 32 and an inner arch 33. A double transverse 52 covers both tires to create a double chain. A wire 54 is located in the middle of the double transverse 52 all the length of transverse of each section. Each wire 54 is attached from one section to the other by a wire ring 55 with a hook. The double transverse 52 is made of two sets of chains which may be staggered from one tire 51 to the next tire to reduce vibration caused by the passage of chains over a paved road.

FIG. 4A shows two half arches 58, 58' spread between a male-female tie 56. The male-female tie comprises an envelope 60 into which slides a male piece 64 of a hooking link 66 at one end of the radial chain 30, where it is attached to the half arch 58.

FIG. 4B shows the envelope 60 in position near the tire 20 with a locking piece 63 being maintained between the envelope 60 and the tire 20 thanks to the presence of two keys 68 which unite the envelope 60 with the male piece 64 through two openings 70 in the male piece 64 and through corresponding openings in the envelope 60. Because of the curvature of the tire the locking piece 63 remains in position against the tire and has no chance of disembarking unless the user uses a prying element to remove the envelope 60 from the vicinity of the tire.

Figure 5:
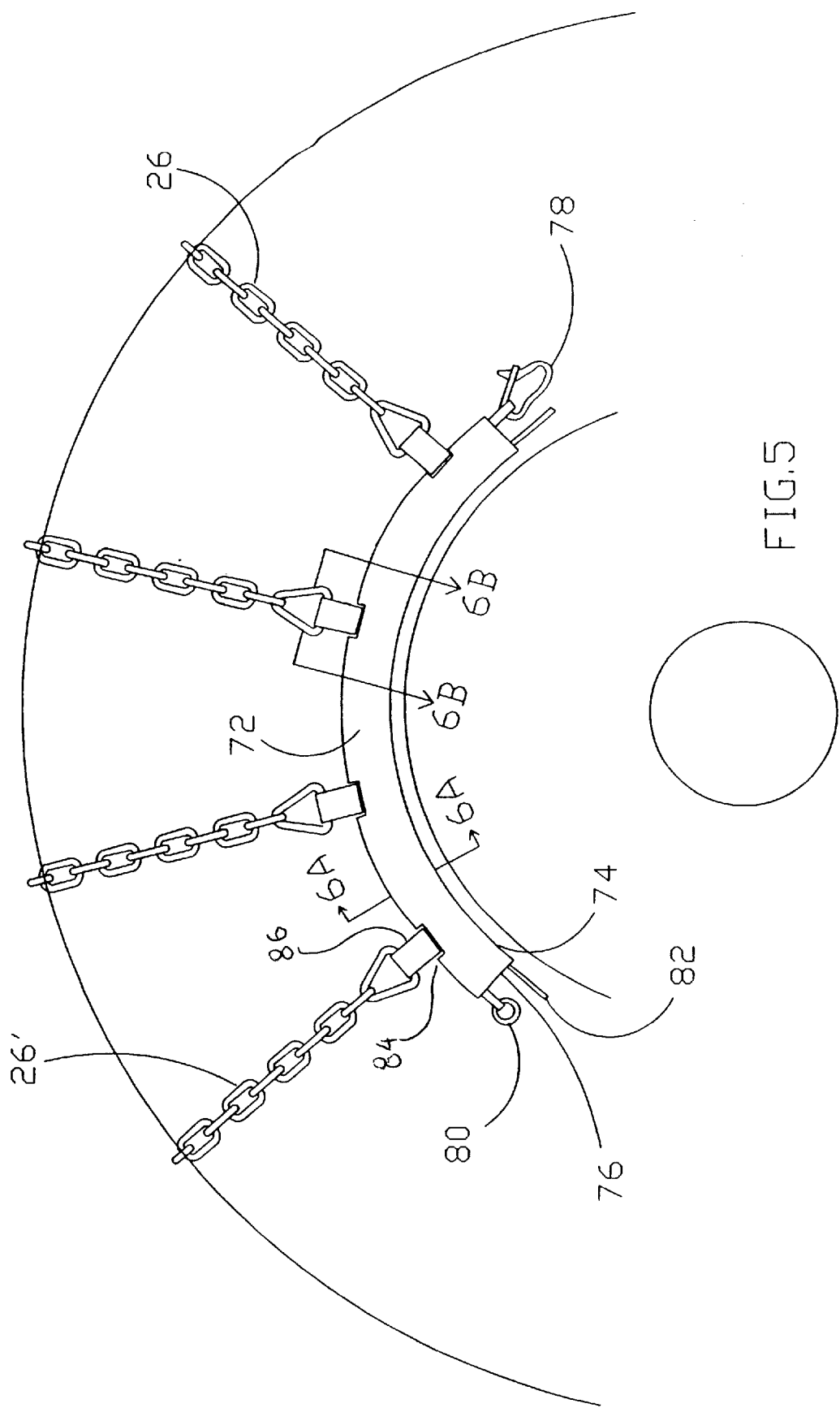
FIG. 5 is a face view of an alternative to FIG. 1.

FIG. 5 shows a sleeve 72 as an alternative to FIG. 1 without radial chains 30; this alternative is particularly applicable on trucks. The embodiment of FIG. 1 is better adapted to off road equipment such as farm tractor, Timberjack, mining equipment, payloader, grader. For use on a truck tire. the sleeve 72 replaces the radial chain 30 and the outer arch 32 by providing the rigidity of the outer arch and the connecting ends 34, 36 of the original radial chain 30. The sleeve 72 comprises a curved body 74 having two ends 76, one end comprising a tying end 78, the other end having a receiving end 80, which plays the same receiving role as the ring 36. The curved body 74 is designed to carry the weight of two neighboring sections. The ends 76 also let pass a small cable 82 to maintain two sections together, to combat the centrifugal effect of a turning wheel which projects the chain outside the tire. The curved body 74 comprises four openings 84 which let pass flat connectors 86 which tie the small chains 26 to the curved body 74. The number of openings 84 may be different from four depending on the size of the tire to be covered.

Figure 6A:
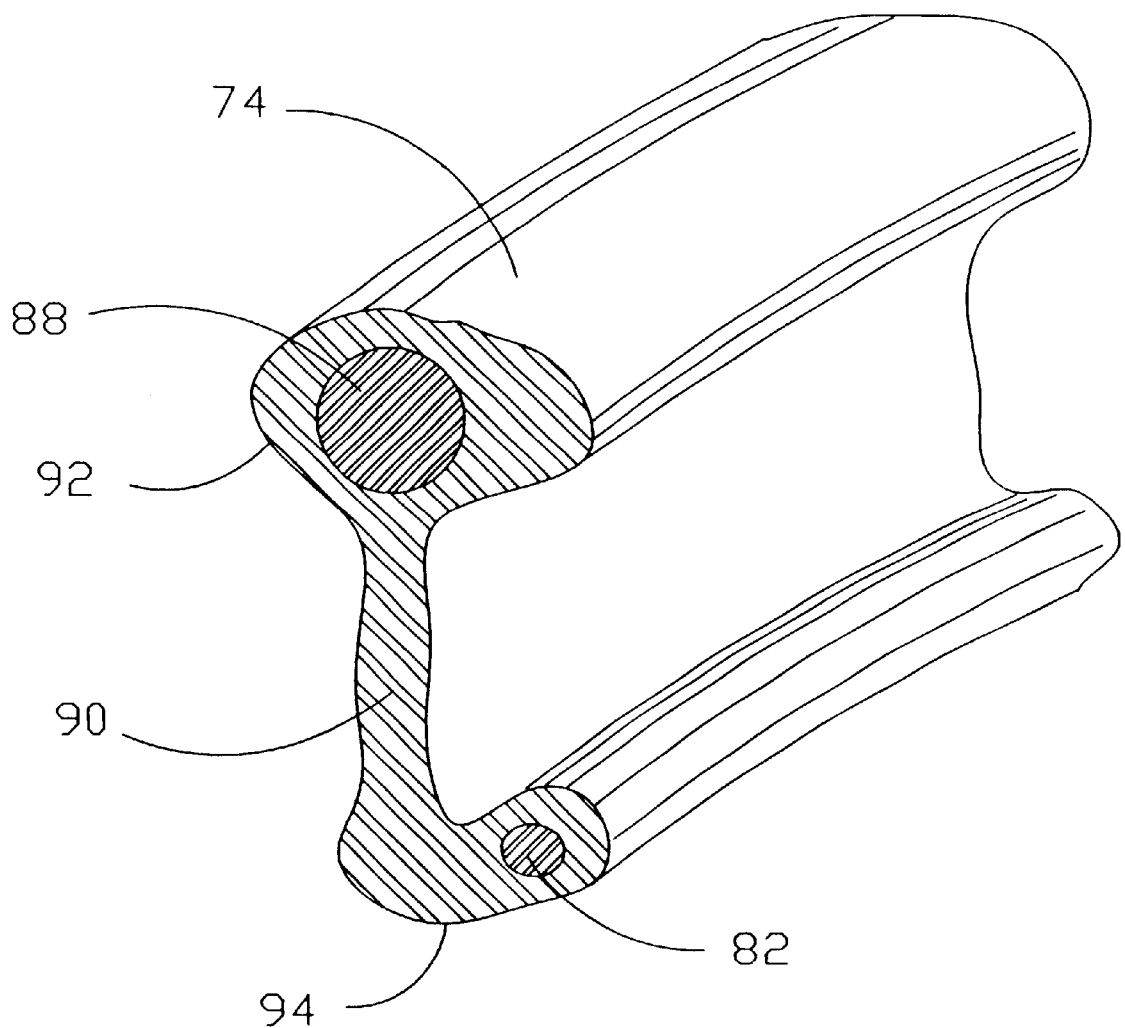
FIG. 6A is a cut view according to line 6A—6A of FIG. 5.

The tying end 78 is related to the receiving end 80 by means of a large cable 88 (FIG. 6A) which supports the curved body 74 and is buried in a C-shaped envelope 90 with a large head 92 and a protruding foot 94. The foot 94 buries the small cable 82. The foot 94 is protruding away from the tire wall to facilitate manual handling when assembling sections and when tightening small cable 82. The C-shape provides rigidity. Aluminum may be used for its light weight, strength and corrosion resistance.

Figure 6B:
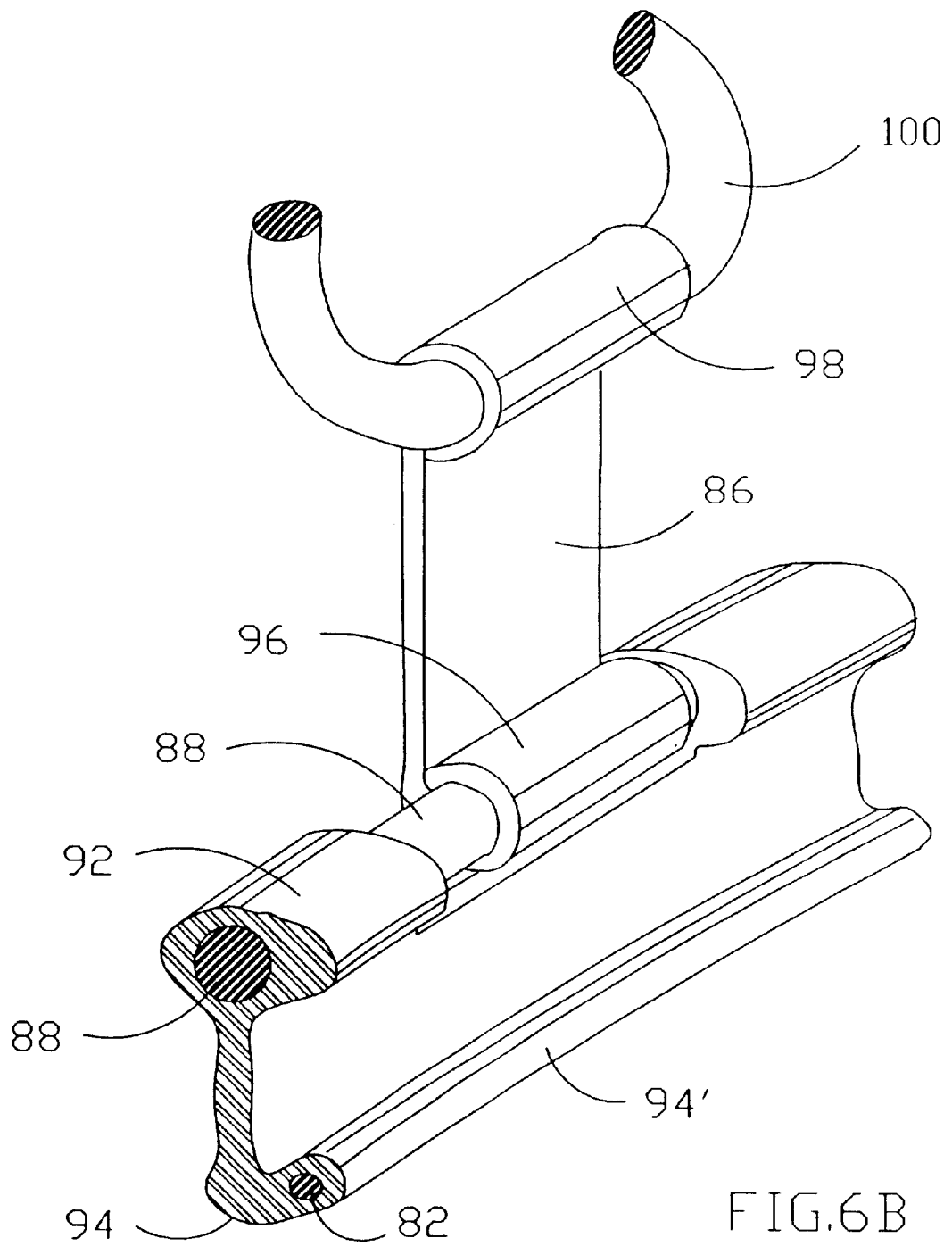
FIG. 6B is a cut view according to lines 6B—6B of FIG. 5.

FIG. 6B shows the flat connector 86 with a curved bottom 96 which surrounds large cable 88 and curved top 98 which surrounds a triangular link 100. Another method implies replacing the flat connector 86 by means of an open link which surrounds the large cable 88 and is locked in place thereafter.

SUMMARY

A universal chain which may be made of modules for easy installation onto tires of various sizes, including mining machinery and open pit machinery. The number of sections of chains depends on the diameter of the tire and on the surface of the thread to cover both on inner and outer sidewalls. Each section comprises a number of transverse links caught by two lengths of chains placed radially along the shoulders and rigidified by arches so that the chain has a cambered form for ease of installation. There are exterior 32 and interior arches 33. On the inner shoulder the sections of chains are caught by hooks that pass through a ring. The outer shoulder comprises an assembly part having two half-arches 58 and an adjustable female male assembly 56 that locks with a preestablished tension and that may be unlocked when needed. This system allows using lengths of chains weighing from 10 to 20 kilograms and having a certain rigidity. This type of chains is adapted to off road equipment of large size. For trucks driving on icy conditions and on hilly roads it is preferable to use the embodiment of FIGS. 5, 6A and 6B with the curved body 74 replacing both the radial chain 30 and the outer arch 32.

It is clearly understood that the mode of construction of this invention which was described above, in reference to the annexed drawings, was given as an indication and is by no means restrictive, and modifications and adaptations thereof may be carried out without the object deviating for all the framework of this invention.

Other embodiments are possible and limited only by the scope of the appended claims:

I claim:

1. A tire encircling universal chain for covering a tire having an accessible area and a bearing area, for providing said tire with chain gripping properties, said universal chain comprising:

a number of sections of chains adapted to cover said accessible area, each said section comprising an exterior radial chain (30), an interior radial chain (30') and a number of transverse chains (26), means for stiffening said exterior and interior radial chains to provide rigid arches for disposing said section over said accessible area, said rigid arches defining an interior arch (33) and an exterior arch (32), said transverse chains extending from said interior arch (33) to said exterior arch (32), means of attaching a section of said accessible area to an adjoining section, to produce a continuous accessible section, a complementary section (44) for covering said bearing area, said complementary section comprising an interior rigid arch and means to attach to a next section, said complementary section comprising transverse chains (50,51) attached to said interior rigid arch on one end, the other end being loose, said complementary section further comprising a pair of exterior half arches (58,58'), in lieu of an exterior rigid arch, each half arch having one end connected to a neighboring section, the two other ends being laid opposite and comprising means to unite and lock, the displacement of an accessible area by moving a vehicle having said tire causing said bearing area to become an accessible area, thereby permitting the attachment of said transverse chains (50,50') to said transverse joints (48,48') and the locking of said half-arches (58) completing the installation of said tire encircling universal chain.

2. The chain of claim 1 wherein the number of sections is three in said accessible area and one in said bearing area.

3. The chain of claim 2 wherein said rigid arches are solid interior arch (33) and exterior arch (32) attached to said radial chains (30) by means of arch fasteners (29).

4. The chain of claim 1 wherein said means of attaching a section comprise, on an external side, a section hook (34) and a section ring (36) both attached to a loose radial chain (30) tied to a rigid exterior arch (32), a pull on said section hook causing a displacement of said exterior arch.

5. The chain of claim 4 wherein said means to unite and lock comprise a male-female tie (56) extending between said two half arches (58), (58'), said male-female tie comprising:
an envelope (60) disposed in a position near said tire (20), said envelope having a pair of holes (69),
a male piece (64) of a hooking link (66) at one end of said radial chain (30), where it is attached to said half arch (58), said male piece being adapted for sliding into said envelope (60), said male piece (64) having openings (70),
a locking piece (63) being maintained between said envelope (60) and said tire (20), said locking piece comprising two keys (68) adapted to unite said envelope (60) with said male piece (64) through said openings (70) in said male piece (64) and through corresponding holes in said envelope (60), because of the curvature of said tire said locking piece (63) remaining in position against said tire and having no chance of disengaging.

* * * * *